(12) United States Patent
Gierer

(10) Patent No.: US 7,374,595 B2
(45) Date of Patent: May 20, 2008

(54) FILTER AND SYSTEM FOR IMPROVED SEALING ON A VACUUM CLEANER

(75) Inventor: Joseph T. Gierer, Glen Carbon, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/561,502

(22) Filed: Nov. 20, 2006

(65) Prior Publication Data

US 2007/0113529 A1    May 24, 2007

Related U.S. Application Data

(60) Provisional application No. 60/739,510, filed on Nov. 23, 2005.

(51) Int. Cl.
*B01D 39/00* (2006.01)
(52) U.S. Cl. .......................... 55/498; 55/502
(58) Field of Classification Search .......... 55/480, 55/490, 492, 493, 498, 502, 507, DIG. 3; 95/273
See application file for complete search history.

(56) References Cited

U.S. PATENT DOCUMENTS

| | | | |
|---|---|---|---|
| 4,797,072 A | 1/1989 | Berfield et al. | |
| 4,906,265 A | 3/1990 | Berfield | |
| 5,404,614 A | 4/1995 | Stephens | |
| 5,455,983 A | 10/1995 | Crouser et al. | |
| 5,606,769 A | 3/1997 | Tomasiak et al. | |
| 5,783,086 A * | 7/1998 | Scanlon et al. | ............. 210/651 |
| 5,954,863 A | 9/1999 | Loveless et al. | |
| 6,110,248 A * | 8/2000 | Liu | ............................. 55/490 |
| 6,113,663 A * | 9/2000 | Liu | ........................... 55/459.1 |
| 6,440,191 B1 * | 8/2002 | Berfield et al. | ............... 55/485 |

* cited by examiner

*Primary Examiner*—Duane Smith
*Assistant Examiner*—Sonji Turner
(74) *Attorney, Agent, or Firm*—Locke Lord Bissell & Liddell LLP

(57) ABSTRACT

The disclosure provides a filter for mounting in a vacuum cleaner, such as a wet and dry vacuum cleaner, having a seal at generally each end, and a corresponding mounting structure that focuses compressive sealing forces on specific seal components rather than the filter body as a whole. The sealing is directed primarily to portions of the seals on the filter ends that are compressed or "pinched" between adjacent surfaces. The concentrated compressive stress provides a well-defined region to consistently provide a sealing engagement. The compressive force can thereby remain relatively constant through multiple uses of the filter.

16 Claims, 6 Drawing Sheets

FILTER AND SYSTEM FOR IMPROVED SEALING ON A VACUUM CLEANER

CROSS REFERENCE TO RELATED APPLICATIONS

This application claims the benefit of U.S. Provisional Appl. No. 60/739,510, filed Nov. 23, 2005, the contents of which are hereby incorporated by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The disclosure relates to the field of vacuum cleaners. More specifically, the disclosure relates to vacuum cleaners having removable filters.

2. Description of the Related Art

Vacuum cleaners are notoriously dusty and dirty, requiring some method to separate the dust and the dirt from the exhaust air. Hence, filters are commonly used to perform this separation function. There often is a need to remove and re-attach the filter, for example when cleaning the filter or replacing it with a new filter. With the type of vacuum cleaner known as wet and dry vacuum cleaners, the filter is also often removed when the vacuum cleaner is used to suction liquids. Thus, special structures accompany a typical wet/dry vacuum cleaner to accommodate removing and replacing the filter.

Typically, a suction system with a motor creates the vacuum and is mounted in a lid that is removably attached to a collection drum for receiving the vacuumed materials. A portion of the lid, herein termed a mounting assembly, extends at least partially downward into the drum and mounts a filter support assembly, such as commonly known as a "cage," that generally covers a vacuum intake to the suction assembly in the lid. The cage is composed of a series of ribs, with a large percentage of open surface area. The ribs support the filter and prevent radially inward collapse of the filter during operation. The lid suctions external air or water through a hose into an opening in the drum or lid, so that water or dirt is deposited into the drum. Remaining material, mainly air, then flows radially inward through the filter for removal of dirt and debris. The filtered air then continues through the filter support assembly into a suction impeller in the lid, and then is exhausted from the vacuum cleaner.

In many such systems, the entire filter body is attached to the mounting assembly by a mounting flange removably attached to the mounting assembly. The filter is inserted over the cage, and a mounting flange of rigid material, such as plastic, is attached to the cage or mounting assembly and used to compress or "sandwich" the filter between the flange and the mounting assembly. The compressive force on the entire filter body and its filter element is the primary force used to seal the filter to the vacuum cleaner and prevent unwanted leakage into the impeller.

Experience has shown that operators have difficulty determining how much compressive force to use on the filter body, because such installation includes compressing the filter element as well. At times, operators use too little force and achieve an inadequate seal, thus allowing leakage of fine dust, resulting in wear on the internal vacuum motor, impeller, and other internal structures. At other times, operators apply too much force and crush the filter or strip the attachment threads, causing repair or replacement of parts. Further, the compressive force can vary without notice to the user, depending, for example, on whether the filter media has been exposed to moisture as is typical in a wet/dry vacuum cleaner.

Therefore, there remains a need for an improved filter design and system for mounting and sealing the filter in such a vacuum cleaner.

BRIEF SUMMARY OF THE INVENTION

The present disclosure provides method, apparatus, and system having an improved filter for a vacuum cleaner, such as a wet/dry type of vacuum cleaner. It is particularly useful for a vacuum cleaner having a filter support assembly, such as a cage, upon which the filter is mounted.

The disclosure provides a filter for mounting in a vacuum cleaner, such as a wet and dry vacuum cleaner, having a seal at generally each end, and a corresponding mounting structure that focuses compressive sealing forces on specific seal components rather than the filter body as a whole. The sealing is directed primarily to portions of the seals on the filter ends that are compressed or "pinched" between adjacent surfaces. The concentrated compressive stress provides a well-defined region to consistently provide a sealing engagement. The compressive force can thereby remain relatively constant through multiple uses of the filter.

The disclosure provides a filter system for a vacuum cleaner, comprising: a main filter support adapted to be fixedly coupled to a mounting assembly of the vacuum cleaner; an outer filter support slidably coupled to the main filter support and extending at least partially around an outer periphery of the main filter support; a filter having a filter element and a lateral seal portion coupled to the filter element, the filter being removably coupled around at least a portion of the outer filter support, and the lateral seal portion being oriented radially inward toward a longitudinal axis of the filter, the lateral seal portion overlapping at least a portion of a periphery of the outer filter support to form an overlapping portion of the seal with the outer filter support, the overlapping portion being adapted to be compressed between the mounting assembly and the outer filter support for sealing.

The disclosure also provides a filter for a vacuum cleaner, the vacuum cleaner having a mounting assembly and a filter support assembly coupled to the mounting assembly to support the filter, comprising: a filter element; and a first lateral seal portion coupled to a first end of the filter element, the lateral seal portion being dimensioned to overlap at least a portion of a periphery of the filter support assembly about which the filter is mounted to form an overlapping portion of the seal with the filter support assembly, the overlapping portion being adapted to be compressed between the mounting assembly and at least a portion of the filter support assembly for sealing the filter.

The disclosure further provides a method of sealing a filter to a vacuum cleaner, the vacuum cleaner having a mounting assembly and a filter support assembly coupled to the mounting assembly to support the filter, the filter support assembly comprising a main filter support fixedly coupled to the mounting assembly and an outer filter support slidably coupled around a peripheral portion of the main filter support, comprising: stretching a lateral seal portion of the filter outwardly around the outer filter support and sliding the filter toward an end of the outer filter support to a smaller cross sectional portion formed between the outer filter support and the mounting assembly; allowing the lateral seal portion to at least partially resume an unstretched position in the smaller cross sectional portion thereby overlapping a portion of the outer filter support with the lateral seal portion; and compressing the overlapping portion to effect a seal of the filter to the vacuum cleaner while avoiding compressing or stretching a filter element of the filter coupled to the lateral seal portion.

The disclosure further provides a filter for a wet and dry vacuum cleaner comprising: a filter element having an opening on at least one end about a longitudinal axis of the filter; a seal coupled to the filter element, the seal formed on the end with said opening, the seal comprising a longitudinal seal portion and lateral seal portion, the longitudinal seal portion protruding in a longitudinal direction from the filter element; the lateral seal portion fixedly attached to the longitudinal seal portion, the lateral seal being oriented radially inward toward the longitudinal axis and having a minimum diameter that is less than the diameter of the filter element, and the lateral seal portion being adapted to be compressed and seal the filter to the vacuum cleaner. The system further comprises another lateral seal portion disposed on the filter distal from the first lateral seal portion and having an overlapping portion with the outer filter support to seal a distal end of the filter.

BRIEF DESCRIPTION OF THE SEVERAL VIEWS OF THE DRAWINGS

A more particular description, briefly summarized above, may be had by reference to the embodiments illustrated in the appended drawings, forming part of the present specification and described herein. It is to be noted, however, that the appended drawings illustrate only some embodiments described herein and are therefore not to be considered limiting of the disclosure's scope, in that there can be other equally effective embodiments.

DETAILED DESCRIPTION

Figure 1:
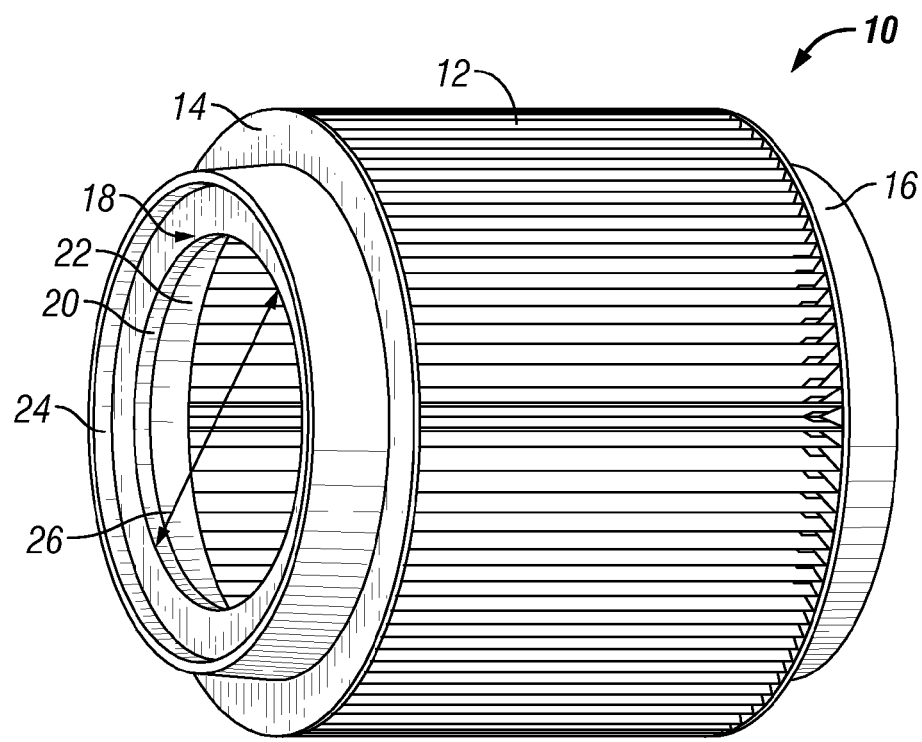
FIG. 1 is a perspective schematic view of an exemplary filter of the present disclosure.
Figure 2:
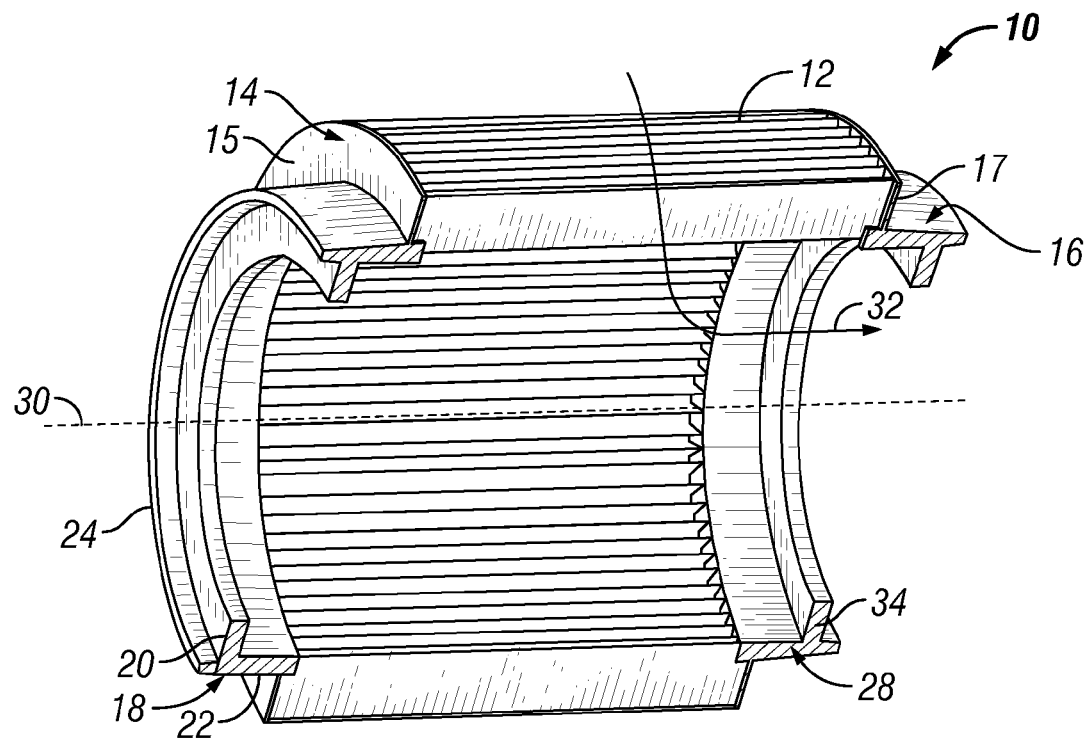
FIG. 2 is a perspective cut-away schematic view of the exemplary filter, showing the filter seals.

FIG. 1 is a perspective schematic view of an exemplary filter of the present disclosure. FIG. 2 is a perspective cut-away schematic view of the exemplary filter, showing the filter seals. The figures will be described in conjunction with each other. The filter 10 includes a first seal end 14, a filter element 12 coupled to the first end 14, and a second seal end 16 coupled to the filter element, the components being disposed along a longitudinal axis 30. The filter element is generally porous material, such as cloth or paper, and can be reinforced with metal or plastic mesh. The media flow 32, such as air, generally is from an outer peripheral portion of the filter 10 through the filter element 12 and into the inner spaces of the filter and then through a filter support assembly and the vacuum cleaner mounting assembly for exhausting, described in more detail below.

Generally, the filter ends 14, 16 include non-porous material to reduce leakage therethrough and seal at the interface between the filter element and the filter ends. Advantageously, the ends can be made of a variety of flexible elastomeric materials that can be stretched and compressed and formed to various shapes, known to those with ordinary skill in the art. While the filter element and ends generally will be sealingly coupled together as an assembly, in other embodiments, the ends can be separate from the filter element.

The filter ends 14, 16 can include transition portions 15, 17, respectively, that support the filter element 12 and seal with the filter element. The transition portions 15, 17 also provide structure in some embodiments for coupling with the seals 18, 28, described herein. While the filter ends 14, 16 are described in terms of various members, it is understood that such description is for convenience of the reader in identifying different portions, because one or more of the members can be integrally formed, in keeping with the definition of "coupling" herein. The term "coupled," "coupling," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include without limitation integrally forming one functional member with another in a unity fashion. The coupling can occur in any direction, including rotationally. Further, the term "end" is used broadly and generally includes the end of the effective filter used for filtering a media passing therethrough for purposes for which the filter was intended.

The filter end 14 includes a seal 18 that includes a lateral seal portion 20. In the embodiment shown, the filter end 16 has a similar structure with seal 28 and its lateral seal portion 34, and so the disclosure will describe primarily the filter end 14 to avoid repetition. It is to be understood that the filter end 14 can vary with the primary goal of sealing the filter to the vacuum cleaner so as to inhibit undesired flow through the vacuum cleaner.

The lateral seal portion 20 is generally coupled to a longitudinal seal portion 22 that is coupled to the transition portion 15 in at least some embodiments. In the embodiment shown, the lateral seal portion 20 extends radially inward toward the longitudinal axis 30 and seals with a filter support assembly, shown in FIGS. 3 and 4. The lateral seal portion has a thickness and composition sufficient to be compressed between two adjacent surfaces, described below, and maintain resiliency upon release. Generally, the lateral seal portion 20 is sized smaller across its inner diametrical dimension 26 than a corresponding cross-sectional dimension of the filter support assembly, so that the lateral seal portion is stretched over the relevant filter support assembly section and then resiliently resumes its shape after the seal is fitted into the undercut area of the filter support assembly, and thus encompasses the filter support assembly.

The longitudinal seal portion 22 can provide additional flexibility by providing a flexible moment arm for movement of the lateral seal portion 20 as it is stretched and compressed into position. The longitudinal seal portion 22 can be formed with the lateral seal portion 20 to form a unitary "L" shaped member. Still further, some embodiments can include a centering flange 24 coupled to the filter end 14, such as to the longitudinal seal portion 22 or the lateral seal portion 20, to form a "T" shaped member. The centering flange 24 can be useful in initial alignments of the filter to the filter support assembly, or alignment of other members to the filter.

Figure 3:
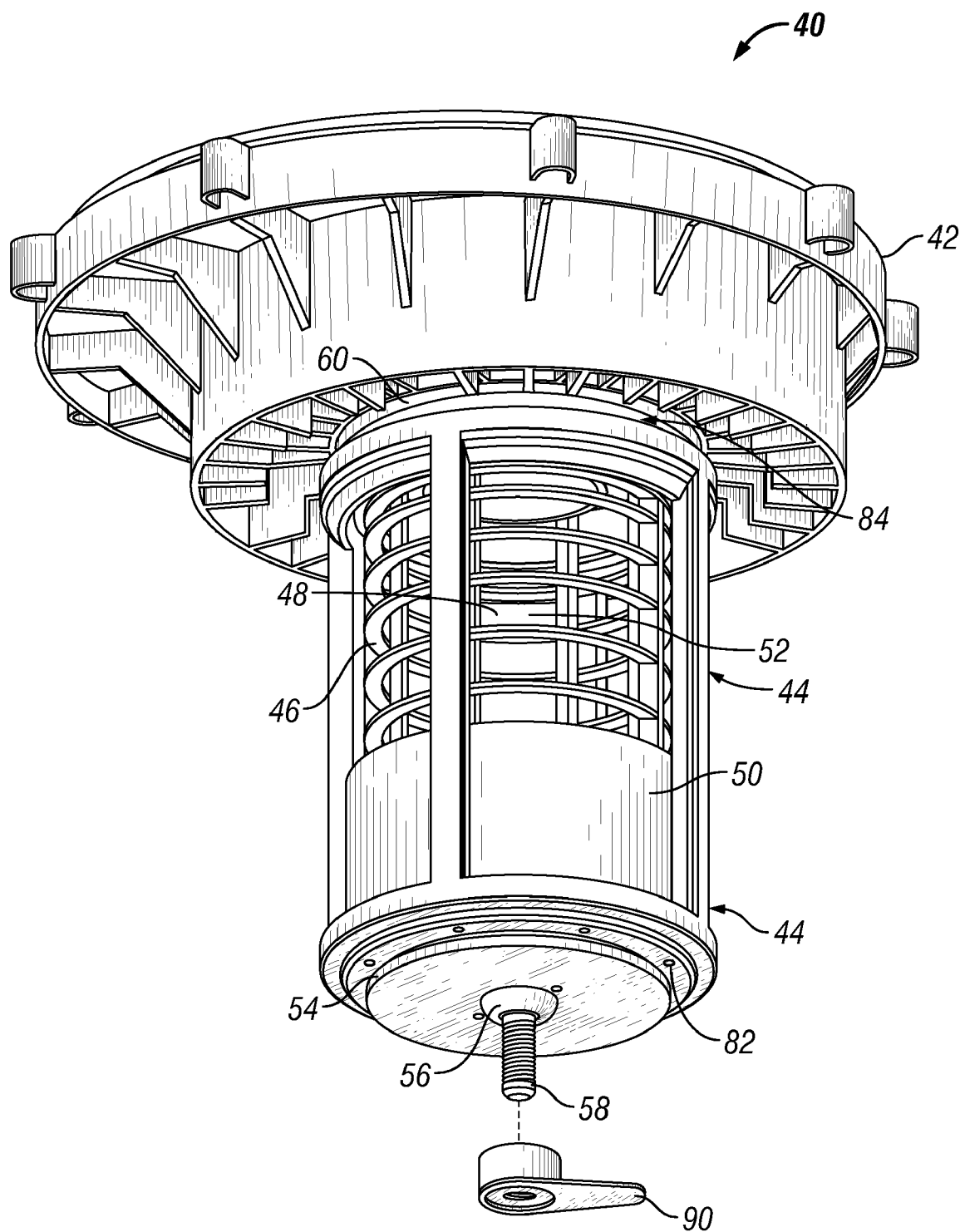
FIG. 3 is a perspective schematic view of an exemplary mounting assembly of the vacuum cleaner having a filter support assembly upon which the filter is mounted.

FIG. 3 is a perspective schematic view of an exemplary mounting assembly of the vacuum cleaner having a filter support assembly upon which the filter is mounted. Having described details of the filter 10, attention is drawn to the system in which the filter is mounted.

The system 40 includes a mounting assembly 42 coupled to other portions of the vacuum cleaner. For clarity, the other portions of the vacuum cleaner, such as a lid to which the mounting assembly attaches, are not illustrated and would be readily understood by those of ordinary skill in the art. The mounting assembly 42 generally includes one or more ports and is coupled to one or more motors, impellers, electrical controls, and other features necessary or desirable to the operation of the vacuum cleaner.

A filter support assembly 44 is generally coupled to the mounting assembly 42. The filter support assembly 44 includes a main filter support 46 that is fixedly attached to the mounting assembly 42 and an outer filter support 50 that is slidably attached to the main filter support. The main filter support 46 includes one or more openings 48, and the outer filter support 50 includes one or more openings 52 generally partially aligned with at least a portion of the openings 48. The openings 48, 52 provide for the flow of air or other media downstream of the filter through the openings and into the mounting assembly 42 for vacuum and subsequent exhaust, as described above. The filter support assembly can further include a centering step 82 to assist in centering and keeping the filter aligned.

The outer filter support 50 is slidably held in position relative to the main filter support 46 by a stop flange 54. The stop flange 54 is in turn attached to the main filter support 46 by any of a number of ways. In at least one embodiment, a mounting member 58 includes a threaded stud extending from the main filter support 46, and in some embodiments it may extend from the stop flange 54. A fastener 56, such as a threaded fastener, can be integrally formed with the stop flange 54, so that the stop flange threadably attaches to the mounting member 58. Other attaching means can be used to attach the stop flange 54 to the main filter support 46, such as thumb screws and nuts, such as a filter nut 90, that can be coupled to the mounting member 58, or screws that can attach the stop flange to the main filter support and secure the stop flange and the filter. Other fasteners can include rivets, snaps, adhesives, or other fasteners as known by those of ordinary skill in the art. Thus, the main filter support and the outer filter support are "sandwiched" between the stop flange 54 and the mounting assembly 42.

The outer filter support 50 can be biased toward the stop flange 54, so that a gap or clearance is formed between the mounting assembly 42 and the outer filter support 50, described in more detail below. The clearance provides a location for a seal of the filter to be relaxed into a natural radial dimension after stretching over the outer filter support and then after mounting is completed to be "pinched" between the mounting assembly and the outer filter support.

Figure 4:
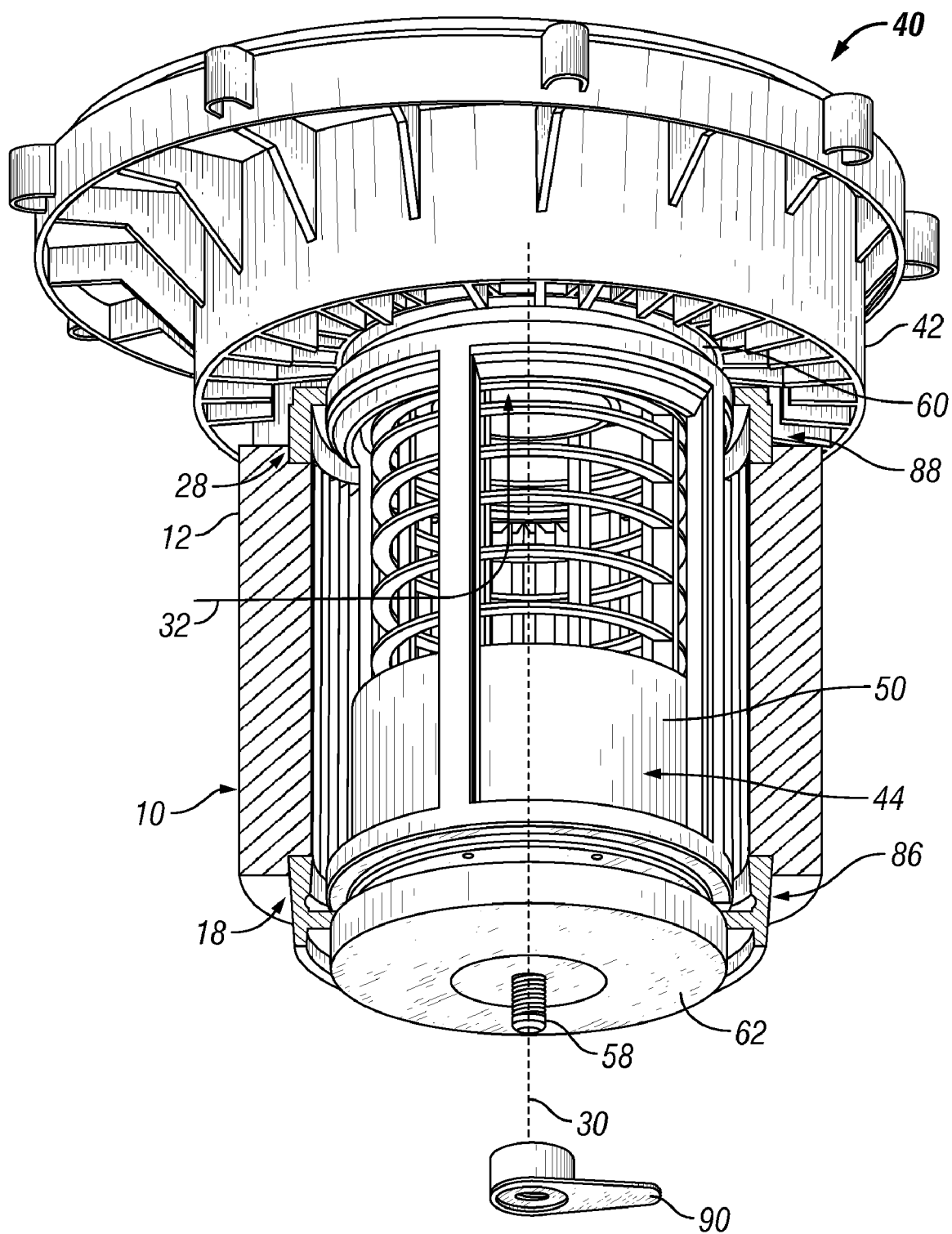
FIG. 4 is a perspective schematic view of the vacuum cleaner mounting assembly with the filter in a perspective cut-away schematic view mounted thereto.
Figures 4A, 4B:
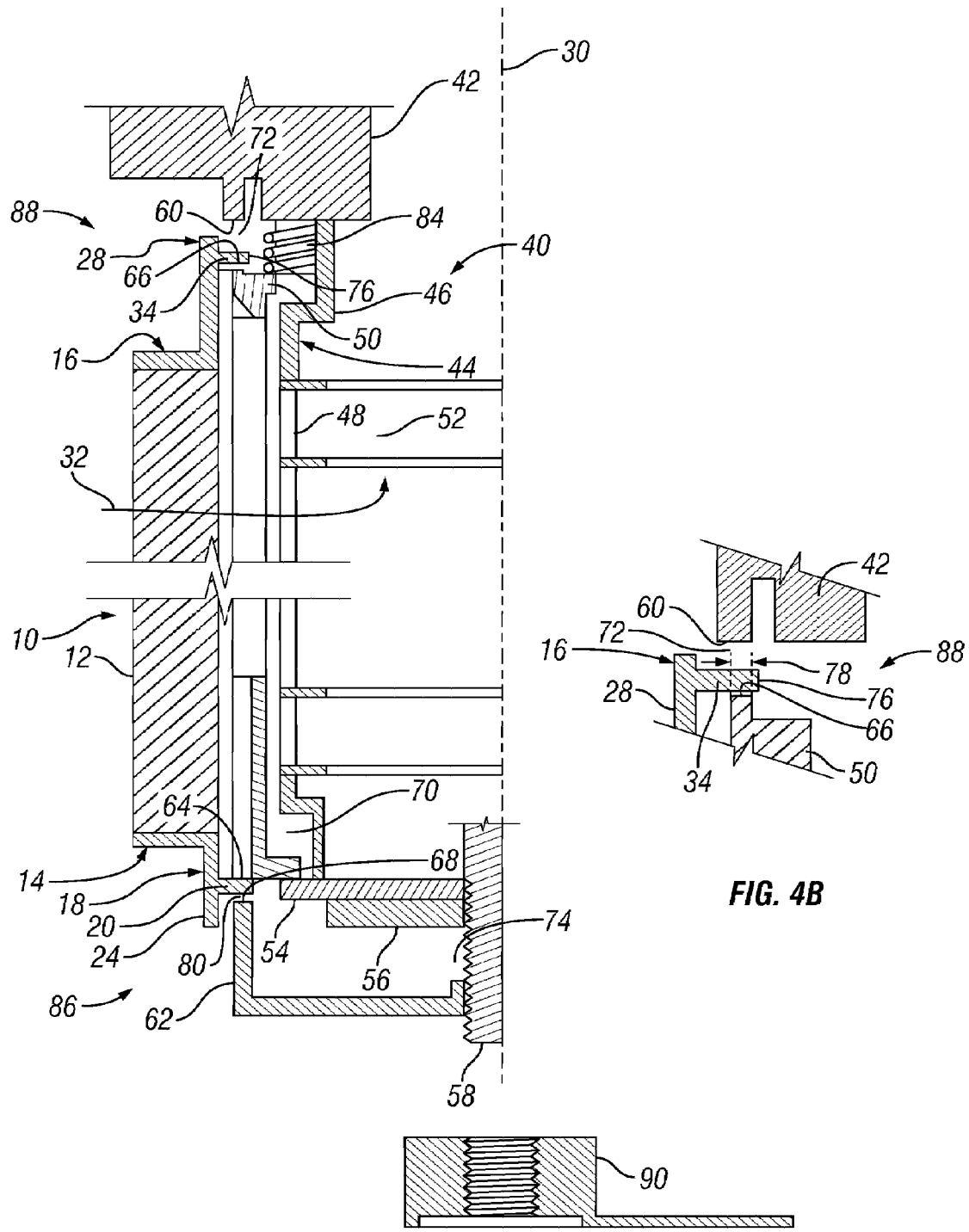
FIG. 4A is a cross-sectional schematic of the filter mounted to the filter support assembly prior to sealing.
FIG. 4B is a schematic cross-sectional view of a portion of a filter seal in an upper end of the filter between the outer filter support and the mounting assembly.

FIG. 4 is a perspective schematic view of the vacuum cleaner mounting assembly with a cut-away schematic view of the filter mounted thereto. FIG. 4A is a cross-sectional schematic of the filter mounted to the filter support assembly prior to sealing. FIG. 4B is a schematic cross-sectional view of a portion of a filter seal in an upper end of the filter between the outer filter support 50 and the mounting assembly 42. The figures will be described in conjunction with each other. It is to be understood that the cross-sections can change and the schematics herein are only exemplary to illustrate the functioning of the various components.

The filter 10, which generally includes the filter element 12 and at least one or more seals 18, 28, is shown mounted around the filter support assembly 44 and more specifically the outer filter support 50. The filter is held in position relative to the filter support assembly 44 by a filter retaining cap 62. The filter retaining cap 62 can be held in place by a separate nut 90 that is attached to the threaded portion of 58, or it can advantageously use an integral mounting nut in the cap, in like manner as the fastener 56 described in FIG. 3 to compress the filter seals 18, 28 described herein. The main filter support includes openings 48 and the outer filter support includes openings 52 at least partially aligned with the main filter support openings. The alignment allows media flow 32, such as air, to flow through the filter element 12 through the outer filter support opening 52, the main filter support opening 48, and then into the mounting assembly 42 and the various components thereof In general, the seal 18 will be disposed between a lower region 86 of the outer filter support and the filter retaining cap 62. The seal 28 can be disposed between an upper region 88 of the outer filter support 50 and the mounting assembly 42. When the filter retaining cap 62 is mounted to the mounting member 58 in a secured condition, the seals 18, 28 are "pinched" or otherwise secured between their respective surfaces. The result is an easily mounted filter to the vacuum cleaner that avoids compression stresses on the filter element 12 while providing sufficient sealing for the filter 10 as a unit. Further, the mounting and sealing of the filter provides a more consistent compressive force that can be more readily sensed by an operator to determine when the filter has been sealed to the filter support assembly using conventional filter-attaching systems wherein the filter body, and particularly the filter media, is compressed by the attachment means.

In this embodiment, the mounting assembly 42 includes a mounting flange 60 extending downwardly, as shown in FIGS. 3, 4, and 4A, and toward the outer filter support 50. The filter support assembly 44 includes a main filter support 46 that is generally secured to the mounting assembly 42. The outer filter support 50 is slidably coupled around the outer periphery of the main filter support 46 and can be held the stop flange 54 or other fasteners as described in referenced to FIG. 3. The stop flange 54 generally has a greater diameter than at least a portion of the main filter support 46 sufficient to extend radially outward to restrict the longitudinal movement of the outer filter support 50. The various components are dimensioned such that sufficient clearance remains for the outer filter support 50 to slide up and down the longitudinal axis 30 within a pre-defined travel between the mounting assembly 42 and the stop flange 54. The amount of travel is dependent, among other things, upon the thickness of the seal and clearance between the seal and the mounting assembly, described in more detail below.

The outer filter support 50 can be biased toward the stop flange 54 by a bias member 84. The biasing member can be a spring, such as a one or more leaf springs or coil springs. The biasing can aid in proper assembly of the filter 10 to more readily allow the lateral seal portion 34 to extend over the end 66 of the outer filter support to be later compressed between the mounting assembly and the outer filter support.

The filter 10 is shown mounted over the outer filter support 50. In general, the distance between the opposing surfaces of the lateral seal portion 20 of the seal 18 and the lateral seal portion 34 of the seal 28 are no greater than the length between the corresponding ends 64, 66 of the outer filter support 50. The relative lengths allow for the lateral seal portions to form an initial seal against the outer filter support during assembly and/or to avoid or minimize compressing or stretching of the filter element 12. Thus, advantageously, the upper surface of the lateral seal portion 20 of seal 18 can contact the first end 64 of the outer filter support and the lower surface of the lateral seal portion 34 of seal 28 can contact the second end 66 of the outer filter support.

In general, it is advantageous to minimize the overall deflection of the lateral seal portion when assembled to the outer filter support 50. Further, the inner diametrical dimension of at least one of the lateral seal portions relative to an outer diameter of the outer filter support is slightly smaller, so that the lateral seal portion is slightly stretched over the main filter support during assembly. When the filter is stretched over the outer filter support and then released into position past the outer filter support to a smaller cross sectional dimension, the lateral seal portions extend radially over each end 64, 66 of the outer filter support to form an overlapping portion 78, as shown in more detail in FIG. 4B.

Thus, the components are generally in the following positions prior to compressing the seals with the filter assembled to the outer filter support. The main filter support 46 is fixedly secured to the mounting assembly 42. The stop flange 54 is mounted to the main filter support 46 in order to fixedly restrain the maximum amount of sliding movement of the outer filter support 50. The outer filter support 50 is biased downwardly away from the mounting assembly 42 by the bias member 84 toward the stop flange 54 to form an upper clearance 72 between the mounting flange 60 and outer filter support and the associated lower clearance 70 between the main filter support and the outer filter support. Further, the filter 10, having ends 14, 16 with seals 18, 28, respectively, is disposed around the periphery of the outer filter support 50. Each seal 18, 28 includes a lateral seal portion 20, 34, respectively, that extends radially inward toward the longitudinal axis 30, so that an overlapping portion 78 engages the ends 64, 66 of the outer filter support 50.

Dimensionally, the sum of the lateral seal portion thickness 76 plus a clearance 72 formed between a mounting flange 60 and the lateral seal portion 34 should be no greater than the clearance 70 longitudinally formed between the main filter support 46 and the outer filter support 50 to provide sufficient travel to allow sealing against the mounting assembly 42. Similarly, the travel 74 of the filter retaining cap 62 should be no less than the sum of the seal clearance 72, the thickness 76 of the lateral seal portions 20, 34 on the ends 14, 16 of the filter, and the clearance 80 formed between the cap seal 68 and the lateral seal portion 20 of seal 18.

To complete the mounting and secure the filter to the vacuum cleaner, the filter retaining cap 62 is simply moved closer to the filter 10 and the outer filter support 50, such as by threadably engaging the mounting member 58. As the cap 62 engages the lateral seal portion 20 of the first seal 18, contact is made. Further travel moves the filter 10 and the outer filter support 50 closer to the mounting flange 60 of the mounting assembly 42. Thus, the clearance 70 is reduced and then contact is made between the mounting assembly and the lateral seal portion 34 of the second seal 28. When sufficient compression is reached, the lateral seal portions 20, 34 of the seals 18, 28 are compressed or "pinched" between the mounting assembly and the cap 62. More specifically, the lateral seal portion 20 of the first seal 18 is compressed between the first end 64 of the outer filter support and the cap seal 68. The lateral seal portion 34 of the second seal 28 is compressed between the mounting flange 60 and the second end 66 of the outer filter support. The compression between the lateral seal portions avoids unnecessarily compressing the filter element 12 and avoids the challenges of the prior art to provide a more secure seal. The structurally rigid outer filter support carries the compression load that would otherwise compress the filter element 12.

Figure 5:
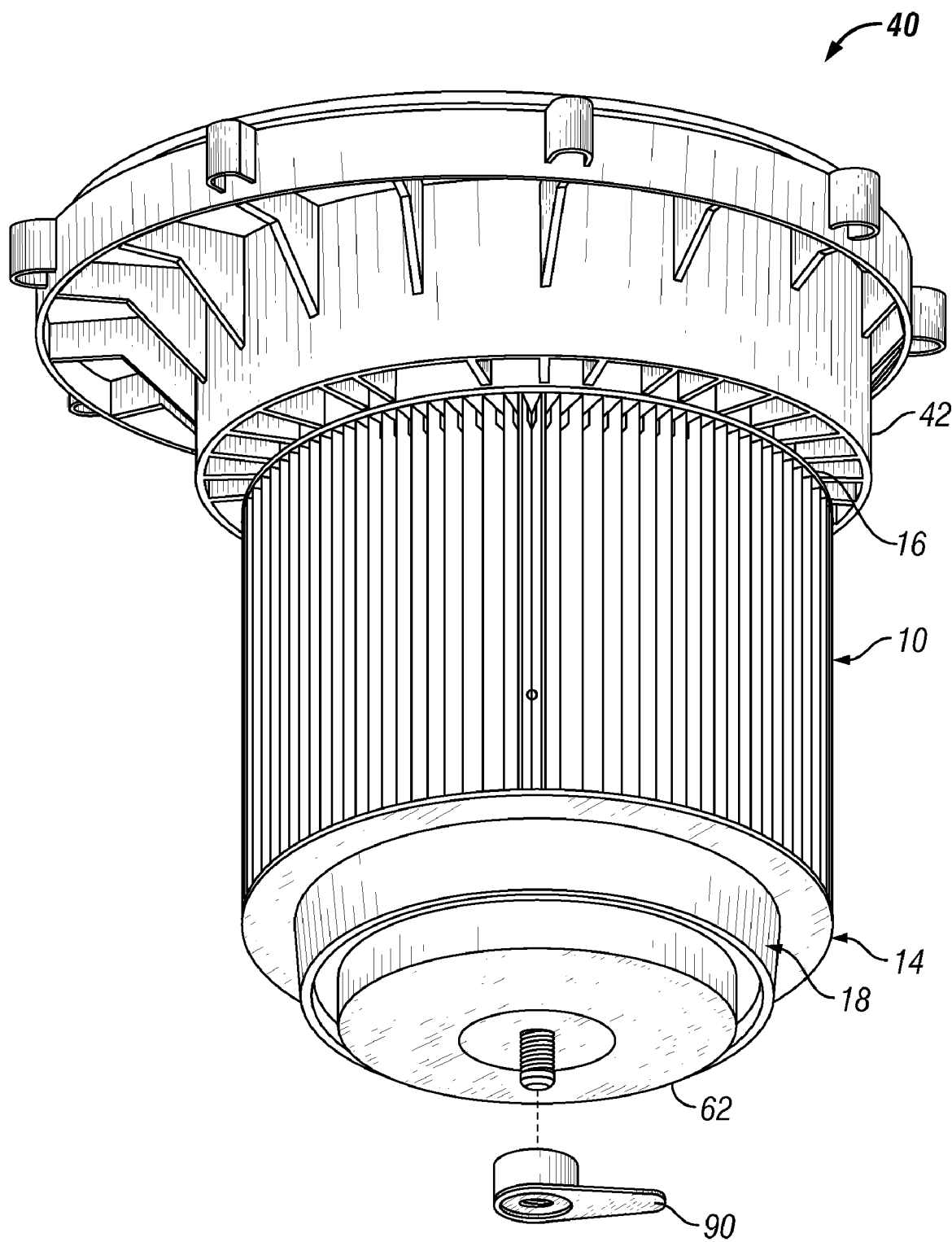
FIG. 5 is a perspective schematic view of the vacuum cleaner mounting assembly with the filter mounted and the seals compressed between the filter retaining cap and the filter support assembly on one end, and between the mounting assembly and the filter support assembly on the other end, independent of the filter media.

FIG. 5 is a perspective schematic view of the vacuum cleaner mounting assembly with the filter mounted and the seals compressed between the filter retaining cap and the outer filter support on one end, and between the mounting assembly and the outer filter support on the other end, independent of the filter element.

The filter 10 is shown assembled to the mounting assembly 42 and is restrained in place by the filter retaining cap 62. The first filter end 14 having a first seal 18 is sealed between the outer filter support 50, described above, and the filter retaining cap 62. The second filter end 16 is sealed between the mounting assembly 42 and the main filter support 50, also described above.

Figure 6:
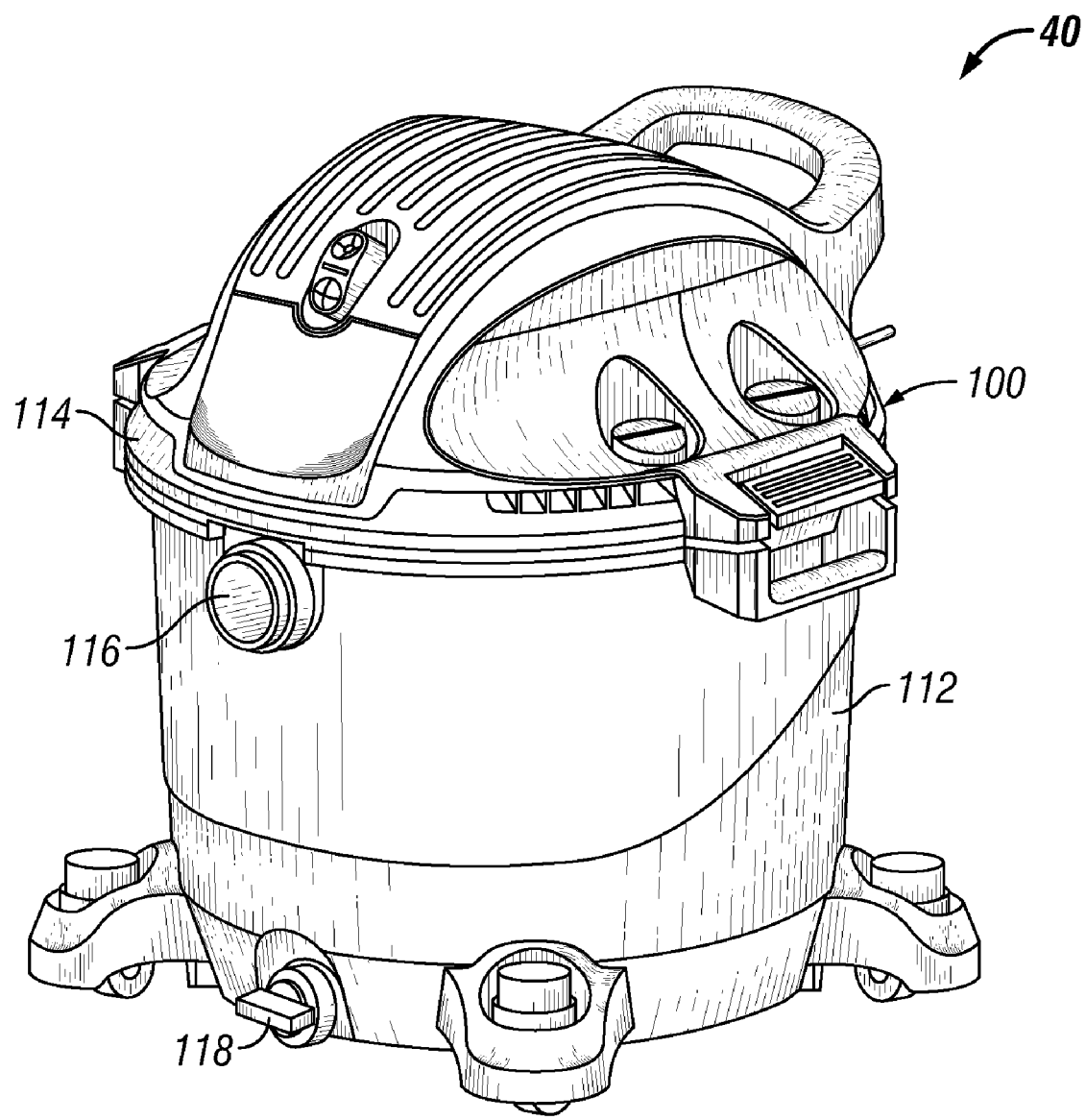
FIG. 6 is a schematic perspective view of an exemplary embodiment of the vacuum cleaner system.

FIG. 6 is a schematic perspective view of an exemplary embodiment of the system 40. The exemplary system shown in FIG. 6 is a wet/dry vacuum cleaner 100 that includes a collection drum 112 and a lid 114 removably attached to the collection drum 112 such that the lid 114 can be removed to empty debris or liquids contained therein. As with known wet/dry vacuums, a motor is generally located proximate to the mounting assembly on the inside portion of the lid 114 of the vacuum cleaner 100, which is operable to create the vacuum inside the collection drum 112 to draw debris or liquid into the collection drum 112 through an inlet port 116. The collection drum further includes a drain 118 so that liquid can be emptied from the collection drum 112 without removing the lid 114. The vacuum cleaner 100 includes the mounting assembly 42, filter support assembly 44, and filter 10, described above, coupled to the underside of the lid 114.

The various steps described or claimed herein can be combined with other steps, can occur in a variety of sequences unless otherwise specifically limited, various steps can be interlineated with the stated steps, and the stated steps can be split into multiple steps. Unless the context requires otherwise, the word "comprise" or variations such as "comprises" or "comprising", should be understood to imply the inclusion of at least the stated element or step or group of elements or steps or equivalents thereof, and not the exclusion of any other element or step or group of elements or steps or equivalents thereof Also, any directions such as "top," "bottom," "left," "right," "upper," "lower," and other directions and orientations are described herein for clarity in reference to the figures and are not to be limiting of the actual device or system or use of the device or system. The device or system may be used in a number of directions and orientations.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant(s), but rather, in conformity with the patent laws, Applicant(s) intend to protect all such modifications and improvements to the full extent that such falls within the scope or range of equivalent of the following claims.

Further, any documents to which reference is made in the application for this patent as well as all references listed in any list of references filed with the application are hereby incorporated by reference. However, to the extent statements might be considered inconsistent with the patenting of this invention such statements are expressly not to be considered as made by the Applicant(s).

The invention claimed is:

1. A filter system for a vacuum cleaner, comprising:
   a main filter support adapted to be fixedly coupled to a mounting assembly of the vacuum cleaner;
   an outer filter support slidably coupled to the main filter support and extending at least partially around an outer periphery of the main filter support; and
   a filter having a filter element and a lateral seal portion coupled to the filter element, the filter being removably coupled around at least a portion of the outer filter support, and the lateral seal portion being oriented radially inward toward a longitudinal axis of the filter, the lateral seal portion overlapping at least a portion of a periphery of the outer filter support to form an overlapping portion of the seal with the outer filter support, the overlapping portion being adapted to be compressed between the mounting assembly and the outer filter support for sealing.

2. The system of claim 1, wherein the overlapping portion of the lateral seal portion is adapted to be compressed between the mounting assembly and the outer filter support without substantially compressing or stretching the filter element coupled thereto.

3. The system of claim 1, further comprising a stop flange coupled to the main filter support distal from the mounting assembly to restrict a longitudinal movement of the outer filter support relative to the main filter support.

4. The system of claim 1, further comprising a filter retaining cap coupled to the main filter support distal from the mounting assembly to secure the filter between the mounting assembly and the filter retaining cap, and another lateral seal portion disposed on the filter distal from the first lateral seal portion and having an overlapping portion with the outer filter support to seal a distal end of the filter between the outer filter support and the lid retaining cap.

5. The system of claim 4, wherein the overlapping portion between the outer filter support and the lid retaining cap is compressed without substantially compressing or stretching the filter element coupled thereto.

6. The system of claim 1, wherein the outer filter support is biased away from the mounting assembly.

7. The system of claim 1, wherein the mounting assembly comprises a mounting flange disposed toward the outer filter support and the overlapping portion is compressed between the mounting flange and the outer filter support.

8. A filter for a vacuum cleaner, the vacuum cleaner having a mounting assembly and a filter support assembly coupled to the mounting assembly to support the filter, comprising:
   a filter element; and
   a first lateral seal portion coupled to a first end of the filter element, the lateral seal portion being oriented radially inward toward a longitudinal axis of the filter, the lateral seal portion being dimensioned to overlap at least a portion of a periphery of the filter support assembly about which the filter is mounted to form an overlapping portion of the seal with the filter support assembly, the overlapping portion being adapted to be compressed between the mounting assembly and at least a portion of the filter support assembly for sealing the filter.

9. The system of claim 8, wherein the overlapping portion of the lateral seal portion is adapted to be compressed between the mounting assembly and filter support assembly without substantially compressing the filter element coupled thereto.

10. The system of claim 8, further comprising another lateral seal portion disposed on the filter distal from the first lateral seal portion and having an overlapping portion relative to the filter support assembly on a distal end from the first lateral seal portion to seal a distal end of the filter to the filter support assembly.

11. The system of claim 8, wherein the system comprises the vacuum cleaner having the filter, mounting assembly, and filter support assembly.

12. A method of sealing a filter to a vacuum cleaner, the vacuum cleaner having a mounting assembly and a filter support assembly coupled to the mounting assembly to support the filter, the filter support assembly comprising a main filter support fixedly coupled to the mounting assembly and an outer filter support slidably coupled around a peripheral portion of the main filter support, comprising:
   stretching a lateral seal portion of the filter outwardly around the outer filter support and sliding the filter toward an end of the outer filter support to a smaller cross sectional portion formed between the outer filter support and the mounting assembly;
   allowing the lateral seal portion to at least partially resume an unstretched position in the smaller cross sectional portion thereby overlapping a portion of the outer filter support with the lateral seal portion; and
   compressing the overlapping portion to effect a seal of the filter to the vacuum cleaner while avoiding substantially compressing a filter element of the filter coupled to the lateral seal portion.

13. A method of sealing the filter of claim 1 to a vacuum cleaner, comprising:
   stretching the lateral seal portion of the filter outwardly around the outer filter support and sliding the filter toward an end of the outer filter support to a smaller cross sectional portion formed between the outer filter support and the mounting assembly of the vacuum cleaner;
   allowing the lateral seal portion to at least partially resume an unstretched position in the smaller cross section portion thereby overlapping a portion of the outer filter support with the lateral seal portion; and
   compressing the overlapping portion to effect a seal of the filter to the mounting assembly while avoiding compressing or stretching the filter element of the filter coupled to the lateral seal portion.

14. A filter for a wet and dry vacuum cleaner, comprising:
   a filter element having an opening on at least one end about a longitudinal axis of the filter;
   a seal coupled to the filter element, the seal formed on the end with said opening, the seal comprising a longitudinal seal portion and lateral seal portion,
      the longitudinal seal portion protruding in a longitudinal direction from the filter element;

the lateral seal portion fixedly attached to the longitudinal seal portion, the lateral seal being oriented radially inward toward the longitudinal axis and having a minimum diameter that is less than the diameter of the filter element, and the lateral seal portion being adapted to be compressed and seal the filter to the vacuum cleaner.

15. The filter of claim 14, farther comprising a second opening formed on a distal end of the filter element from the other opening and having a second seal coupled to the filter element comprising a longitudinal and lateral seal portions.

16. The filter of claim 14, further comprising another lateral seal portion disposed on the filter distal from the first lateral seal portion and having an overlapping portion with the outer filter support to seal a distal end of the filter.

* * * * *